United States Patent [19]
Becker

[11] Patent Number: 4,874,840
[45] Date of Patent: * Oct. 17, 1989

[54] STABILIZATION OF POLY(ARYLENE ETHER KETONES)

[75] Inventor: Paul Becker, San Bruno, Calif.

[73] Assignee: Raychem Corporation, Menlo Park, Calif.

[*] Notice: The portion of the term of this patent subsequent to Oct. 17, 2006 has been disclaimed.

[21] Appl. No.: 229,083

[22] Filed: Aug. 5, 1988

[51] Int. Cl.$^4$ .................. C08G 8/02; C08G 14/00
[52] U.S. Cl. ............................ 528/480; 528/125; 528/126; 528/128; 528/174; 528/175; 528/206
[58] Field of Search ............... 528/480, 125, 128, 126, 528/174, 175, 206

[56] References Cited

U.S. PATENT DOCUMENTS

| | | | |
|---|---|---|---|
| 3,065,205 | 2/1962 | Bonner | 528/182 |
| 3,441,538 | 12/1969 | Marks | 528/86 |
| 3,637,592 | 7/1972 | Berr | 528/194 |
| 3,751,398 | 5/1973 | Dahl | 528/501 |
| 3,767,620 | 2/1973 | Angelo et al. | 525/419 |
| 3,953,400 | 6/1976 | Dahl | 528/179 |
| 3,956,240 | 3/1976 | Dahl et al. | 528/125 |
| 4,320,224 | 5/1982 | Rose et al. | 528/125 |
| 4,361,693 | 11/1982 | Jansons | 528/86 |
| 4,611,033 | 6/1986 | Maresca | 525/419 |
| 4,709,007 | 10/1987 | Jansons et al. | 528/222 |

FOREIGN PATENT DOCUMENTS 971227 9/1964 United Kingdom.

OTHER PUBLICATIONS

Attwood et al., Polymer 22, 1096, (1981).

*Primary Examiner*—John Kight
*Assistant Examiner*—M. L. Moore
*Attorney, Agent, or Firm*—Yuan Chao; Edith A. Rice; Herbert G. Burkard

[57] ABSTRACT

A method is provided for stabilizing a poly(arylene ether ketone), comprising the steps of:
(a) digesting the poly(arylene ether ketone) in an aqueous medium to remove polymerization solvent, and
(b) hydrothermally treating the poly(arylene ether ketone) by heating it to a temperature of at least 160° C. while contacting it with water.

14 Claims, 2 Drawing Sheets

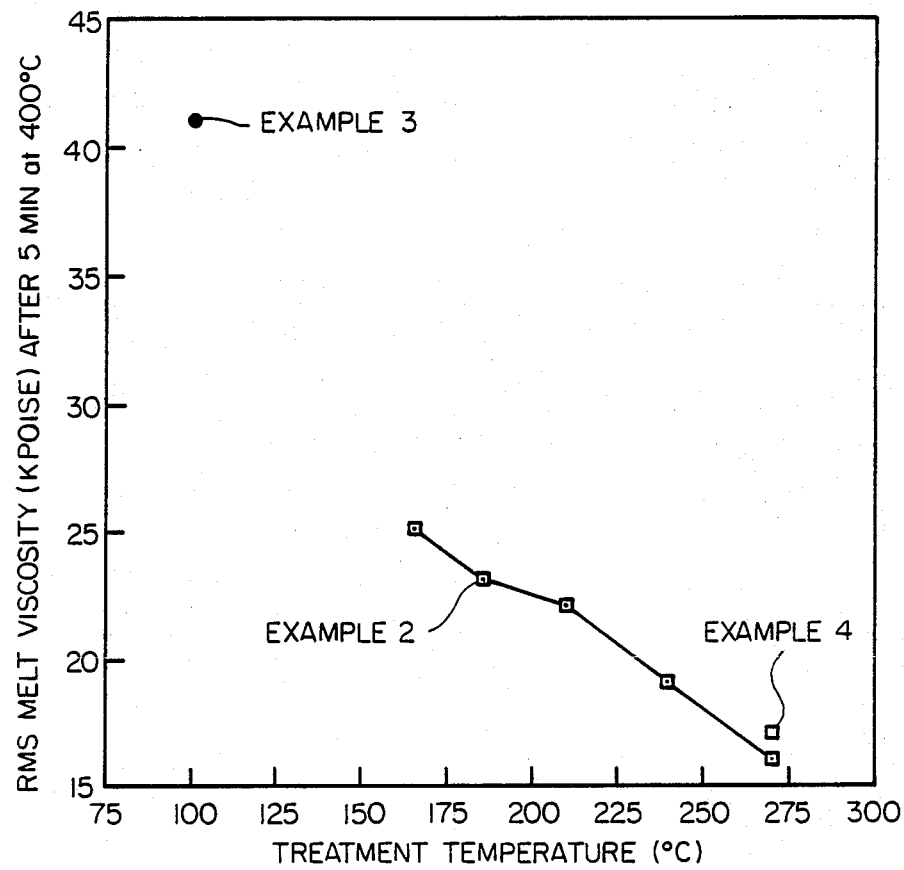
FIG_1

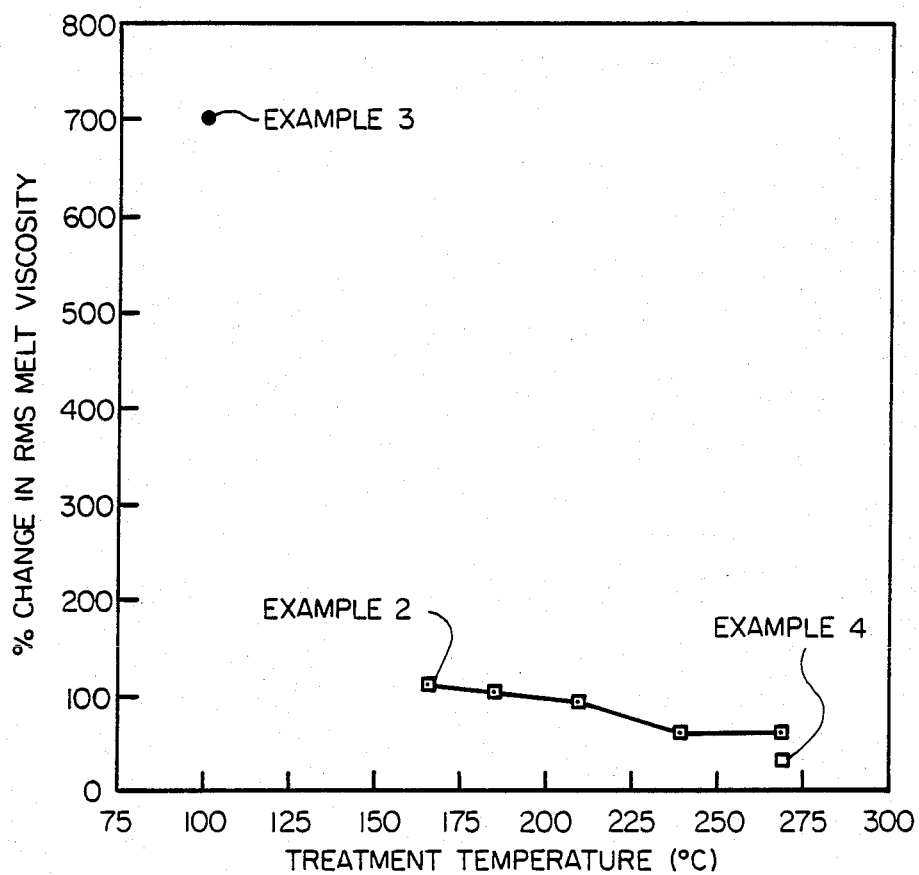
FIG_2

STABILIZATION OF POLY(ARYLENE ETHER KETONES)

BACKGROUND OF THE INVENTION

This invention relates to a method of stabilizing poly(arylene ether ketones).

Poly(arylene ether ketones) (PAEK's), in particular para-linked ones, possess many desirable properties, for example, high temperature stability, mechanical strength, and resistance towards common solvents. Two types of PAEK synthesis are known in the art, commonly referred to as electrophilic and nucleophilic synthesis, respectively.

In an electrophilic synthesis, the polymerization step leads to formation of an aryl ketone group, drived from reaction the between an aromatic acid halide (or similarly reactive acyl derivative) and an activated hydrogen atom attached to an aromatic carbon atom, i.e., a hydrogen displaceable under the electrophilic reaction conditions. The monomer system can be (a) phosgene or an aromatic diacid dihalide such as terephthaloyl chloride and a polynuclear aromatic compound containing two activated hydrogen atoms such as 1,4-diphenoxybenzene or (b) a polynuclear aromatic compound containing both an acid halide group and an activated hydrogen atom, such as p-phenoxybenzoyl chloride.

An electrophilic synthesis is sometimes also referred to as a Friedel-Crafts synthesis or polymerization. Typically, it is carried out in a reaction medium comprising the monomer(s), a catalyst such as anhydrous aluminum trichloride, and an inert solvent such as methylene chloride. Because the carbonyl groups of the monomer(s) or other reactant(s) complex with aluminum trichloride and thereby deactivate it, the aluminum trichloride catalyst is generally employed in an amount slightly more than one equivalent for each equivalent of carbonyl groups in the reaction medium. Other metal halides such as ferric chloride can also be employed as the catalyst. The preparation of PAEK's by Friedel-Crafts polymerization with aluminum chloride as catalyst is disclosed by Bonner, in U.S. Pat. No. 3,065,205 (1962); Goodman, in GB 971,227 (1964); and Jansons et al., in U.S. Pat. No. 4,709,007 (1987). Friedel-Crafts polymerization may also be effected in anhydrous hydrogen fluoride-boron trifluoride. See, e.g., Marks, in U.S. Pat. No. 3,441,538 (1969); Dahl, in U.S. Pat. No. 3,953,400 (1976); and Dahl et al., in U.S. Pat. No. 3,956,240 (1976).

In a nucleophilic synthesis, the polymerization step leads to the formation of an aryl ether group, derived from the reaction of a phenoxide group with an aryl halide group in which the halide is activated towards nucleophilic displacement. The phenoxide containing monomer may be a bisphenol such as hydroquinone, while the halide containing monomer may be a dihalide such as 4,4'-difluorobenzophenone. Exemplary nucleophilic syntheses are disclosed in Rose et al., U.S. Pat. No. 4,320,224 (1982), and in Attwood et al., Polymer 22, 1096 (1981).

The tendency of their carbonyl groups to form complexes and their crystallinity and insolubility in most solvents make it difficult to isolate PAEK's from the polymerization mixture without their containing catalyst residues and other impurities. Further, such impurities are difficult to remove from the isolated polymer. These impurities are undesirable, because they may adversely affect polymer stability during later use. As part of the regular work-up technique, PAEK's have commonly been dried in vacuo, typically at a temperature between 100° and 160° C., although temperatures up to 220° C. have been used. See, e.g., Marks, Dahl '400, and Dahl '240, cited supra, and Berr, U.S. Pat. No. 3,637,592 (1972).

Special techniques have been proposed for the isolation or post-isolation treatment of PAEK's to improve their properties. Dahl, in U.S. Pat. No. 3,751,398 (1973), discloses a spray drying process in which sulfur dioxide, preferably 90-99% by volume, is admixed into a hydrogen fluoride-boron trifluoride polymerization medium and the mixture is atomized. Maresca, in U.S. Pat. No. 4,611,033 (1986), discloses a stabilization process in which the polymer is treated with a dicarbonyl chelating agent such as pentanedione. Angelo et al., in U.S. Pat. No. 3,767,620 (1973), disclose that certain PAEK's may have xanthydrol end-groups and that the thermal stability of such PAEK's can be improved by reducing the xanthydrol groups to xanthene groups with reductants such as formic acid or triethylsilane. These techniques share a common disadvantage in that they may require the addition of a chemical agent whose own removal from the polymer could be problematic.

I have invented a novel treatment for PAEK's which significantly reduces the impurity levels therein and improves their properties such as melt stability and/or melt viscosity.

SUMMARY OF THE INVENTION

A method is provided for stabilizing a poly(arylene ether ketone), comprising the steps of:
(a) digesting the poly(arylene ether ketone) in an aqueous medium to remove polymerization solvent, and
(b) hydrothermally treating the poly(arylene ether ketone) by heating it to a temperature of at least 160° C. while contacting it with water.

BRIEF DESCRIPTION OF THE DRAWINGS

FIG. 1 compares the melt viscosity of polymer samples treated according to this invention against the melt viscosity of a polymer sample not treated according to this invention.

FIG. 2 compares the melt stability of polymer samples treated according to this invention against the melt stability of a polymer sample not treated according to this invention.

DESCRIPTION OF PREFERRED EMBODIMENTS

I have discovered that the stability of a PAEK, particularly its stability under melt processing conditions, can be substantially improved by a two-step aqueous treatment, the first step being a digestion in an aqueous medium to remove solvent from the polymerization reaction and the second step being a hydrothermal treatment step. Among the benefits achievable through my invention are lowered levels of impurities such as chloride and/or aluminum in the final polymer, lighter color extrudates upon melt-processing, lowered melt viscosity and/or improved melt stability.

The aqueous medium for the digestion step preferably consists essentially of water. For example, tap or deionized water may be added to polymer freshly isolated from the polymerization mixture. It is to be understood that the presence of some additional materials, such as small amounts of hydrochloric acid and aluminum salts from the hydrolysis of aluminum chloride catalyst residues, may be unavoidable. But the addition to the aqueous medium of significant amounts of additional substances which have deleterious effects on the quality of the PAEK should of course be avoided. For example, it is undesirable to add acids (or bases) which would lower (or raise) the pH of the aqueous medium to a very low (or high) value. The amount of aqueous medium to be used is preferably sufficient to at least partially immerse the PAEK therein. More preferably, the PAEK is completely immersed. More specifically, the aqueous medium preferably represents at least 75, and more preferably, between about 90 and about 99 weight per cent of the combined PAEK and aqueous medium.

A major objective of the digestion step is the removal of any polymerization solvent which might be entrained or entrapped in the PAEK. Also, some hydrolysis of catalyst residues may be effected. It may be conducted open to the atmosphere or under vacuum conditions. The digestion temperature may be between about 35° and about 110° C. It is conveniently performed by heating the aqueous medium to a reflux at atmospheric pressure and allowing the polymerization solvent to be distilled or azeotroped out of the medium.

In one embodiment, the digestion step is performed in two stages: in a first stage at a first, lower temperature and in a second stage at a second, higher temperature. Preferably, the first temperature is between about 10° and about 40° C., that is approximately ambient temperature. Preferably, the second temperature is between about 40° and about 100° C., most preferably under reflux as described hereinabove.

The duration of the digestion step is preferably at least 0.5 hr, more preferably at least 6 hr. The upper limit for its duration is not critical, since the conditions are mild enough so that no damage to the PAEK is likely to result from an overlong digestion. Indeed, where it is inconvenient to proceed immediately to the hydrothermal treatment step, the PAEK may be left digesting indefinitely.

By a hydrothermal, it is meant heating the PAEK to a temperature of at least about 160° C. while contacting the PAEK with water. However, the temperature should not be too high, for then there may be some degradation of the PAEK. Thus, the maximum temperature is preferably below about 310° C., and more preferably below about 300° C. The temperature is preferably between about 210° and about 270° C., most preferably between about 240° and 270° C. The heating time is preferably between about 0.5 and about 17 hours, more preferably between about 0.5 and about 3 hours. The minimum heating time for effective treatment may be readily determined empirically. Overlong heating, particularly at temperatures about or above 300° C., may result in damage to the polymer.

In a preferred embodiment, the hydrothermal treatment step is performed in a pressurized vessel, with the PAEK at least partially, and preferably completely, immersed in an aqueous medium which preferably consists essentially of water. The duration of the hydrothermal treatment step is preferably between about 0.5 and about 17 hr. The amount of aqueous medium is preferably 90-99 weight per cent of the combined PAEK and aqueous medium. The digestion and hydrothermal steps may be conveniently performed in the same vessel, using the same aqueous medium. Suitable pressurized vessels are, for example, a Parr bomb or autoclave. The pressure build-up varies with temperature, for example approximately 90 psi at 160° C. and approximately 1245 psi at 300° C., and may be readily estimated by reference to water vapor pressure tables, such as found in the Handbook of Chemistry and Physics, 67th Ed. (1986–1987), pp. D190–191 (CRC Press). If a PAEK is made by a Friedel-Crafts polymerization, the impurities therein are likely to be of an acidic nature (e.g., aluminum chloride residue), and the pH of the water may therefore drop somewhat during the heat treatment. In such instances, the vessel should be made of an acid corrosion resistant material, such as titanium. Glass lined pressure vessels may also be used, if the time-temperature combinations involved do not exceed those for which such vessels are rated.

In another embodiment, the hydrothermal step is performed by charging superheated steam into a chamber in which the PAEK is contained.

My invention is particularly efficacious in lowering polymer melt viscosity, increasing melt stability, and lightening the color of polymer extrudate. It may also lower the levels of chloride and aluminum residues.

PAEK's which may advantageously be treated according to our invention include those having the following repeat units, or copolymers having combinations of these repeat units:

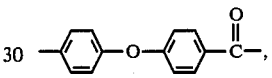

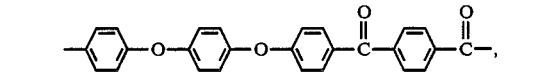

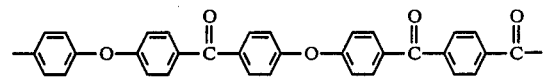

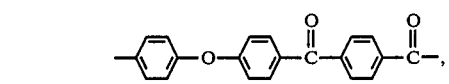

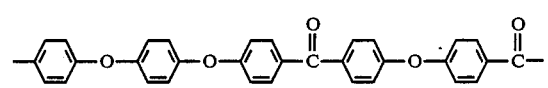

and

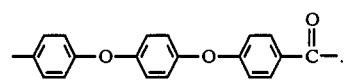

PAEK's such as the above ones may be prepared by polymerizing, in the presence of a Lewis acid catalyst, a monomer system comprising (a) (i) phosgene or an aromatic dicarboxylic acid dihalide and (ii) a substantially stoichiometric amount of a polynuclear aromatic comonomer having two active hydrogen atoms or (b) a polynuclear aromatic carboxylic acid halide having an active hydrogen atom.

Suitable aromatic dicarboxylic acid dihalides include: terephthaloyl chloride, isophthaloyl chloride, [1,1'-biphenyl]-4,4'-dicarbonyl dichloride, naphthalene-1,4-dicarbonyl dichloride, naphthalene-2,6-dicarbonyl dichloride, napthalene-3,6-dicarbonyl dichloride, benzophenone-4,4'-dicarbonyl dichloride, and diphenyl ether-4,4'-dicarbonyl dichloride. Terephthaloyl chloride, isophthaloyl chloride, [1,1'-biphenyl]-4,4'-dicarbonyl dichloride, and diphenyl ether-4,4'-dicarbonyl dichloride are preferred.

Suitable polynuclear aromatic comonomers having two active hydrogen atoms include: diphenyl ether, 1,4-diphenoxybenzene, 4-phenoxybiphenyl 4,4'-diphenoxybiphenyl, 4,4'-diphenoxybenzophenone, 4,4'-diphenoxydiphenylsulfone, 1,3-bis(4-phenoxybenzoyl)benzene, and 1,4-bis(4-phenoxybenzoyl)benzene. Diphenyl ether, 1,4-diphenoxybenzene, 4,4'-diphenoxybenzophenone, 1,3-bis(4-phenoxybenzoyl)benzene, and 1,4-bis(4-phenoxybenzoyl)benzene are preferred.

Suitable polynuclear aromatic carboxylic acid halides having an active hydrogen atom include: p-phenoxybenzoyl chloride, 4-biphenyloxybenzoyl chloride, 4'-phenoxybiphenyl-4-carbonyl chloride, and 4'-phenoxybenzophenone-4-carbonyl chloride. p-Phenoxybenzoyl chloride is preferred.

The PAEK may, in addition to arylene, ether and ketone groups, contain other functionalities introduced through appropriate comonomers. For example, sulfone groups may be introduced by using 4,4'-diphenoxydiphenyl sulfone as a comonomer. PAEK's further comprising imide, amide, ester, azo, quinoxaline, benzimidazole, benzoxazole, or benzothiazole groups may similarly be prepared by using monomers having such groups. See Dahl et al., EP 178, 185 (1986).

Suitable Lewis acids include aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. A referred Lewis acid is aluminum trichloride.

A preferred Friedel-Crafts process for making PAEK's is described by Jansons et al. in U.S. Pat. No. 4,709,007 (1987), the disclosure of which is incorporated herein by reference. This application discloses a method of moderating or controlling Friedel-Crafts polymerizations by the addition of a Lewis base which acts as a controlling agent or by using specified excesses of the Lewis acid.

Preferred Lewis bases include diphenyl sulfone, dimethyl sulfone, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, potassium chloride, potassium bromide, and mixtures thereof. Particularly preferred Lewis bases are lithium chloride, N,N-dimethylformamide, dimethyl sulfone, and sulfolane.

Additionally, protic controlling agents, e.g. water, n-alkanols, or benzoic acid, may be used, as described in copening application of Towle, Ser. No. 07/096,415, filed Sep. 11, 1987, the disclosure of which is incorporated herein by reference.

The molecular weight of the PAEK, the degree of branching, and amount of gelation may be controlled by the use of, for example, capping agents as described in Dahl, U.S. Pat. No. 4,247,682 (1981), the disclosure of which is incorporated herein by reference. The capping agent may be an electrophilic one, for example, benzoyl chloride, or a nucleophilic one, for example 4-phenoxybenzophenone, or combinations thereof.

In the preparation of PAEK's by a Friedel-Crafts polymerization, a Lewis acid is employed. As a result, the polymer contains Lewis acid complexed to the carbonyl groups of the polymer. For many polymerizations, the Lewis acid is complexed to substantially all the carbonyl groups in the polymer. As is well known with polymers of this type, the catalyst residue must be removed, i.e., the Lewis acid must be decomplexed from the polymer and removed. A method for removing the catalyst residue is described by Dahl in U.S. Pat. No. 4,237,884, the disclosure of which is incorporated herein by reference.

Decomplexation may be accomplished by treating the polymerization reaction mixture with a decomplexing base after completion of polymerization. The base can be added to the reaction medium or the reaction medium can be added to the base. The decomplexing base must be at least as basic towards the Lewis acid as the basic groups on the polymer chain. Such decomplexation should be effected before the isolation of the polymer from the reaction mixture and heat treatment according to the instant invention.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide tetramethylene sulfone, benzophenone, tetramethylammonium chloride, isopropanol, and the like. The decomplexed polymer can then be recovered by conventional techniques such as separating the polymer by filtration; adding a nonsolvent for the polymer which is a solvent for or miscible with the Lewis acid/Lewis base complex and the Lewis acid; spraying the reaction medium into a nonsolvent for the polymer; or evaporating the volatiles from the reaction medium and then washing with an appropriate solvent to remove any remaining base/catalyst complex and diluent from the polymer.

In the recovery of the polymer from the reaction mixture, the reaction mixture may be liquefied, if desired, by the method described by Reamey in U.S. Pat. No. 4,665,151 (1987), the disclosure of which is incorporated herein by reference.

Throughout this application, inherent viscosity refers to the mean inherent viscosity determined according to the method of Sorenson et al., "Preparative Methods of Polymer Chemistry," 2nd ed., (Interscience 1968), at page 44 (0.1 g polymer dissolved in 100 mL of concentrated sulfuric acid at 25° C.). Preferably, a PAEK has a high molecular weight, by which is meant a PAEK having an inherent viscosity greater than about 0.6 dL/g.

PAEK melt stability is analyzed by a low shear rate technique using a Rheometrics Mechanical Spectrometer (RMS). The PAEK is melt pressed into a circular plaque which is positioned between aluminum disks in the RMS and heated to 400° C. while under a low flow of nitrogen. The melt viscosity is monitored for 60 min. at a frequency of 0.5 rad/sec. The 5 minute melt viscosity is taken as the initial melt viscosity of the sample. The percent change in melt viscosity over the next 55 min. is used as a basis for comparing the melt stabilities between different samples.

Aluminum residue analysis was performed by the following general procedure. PAEK was dissolved in fuming nitric acid. The PAEK was then precipitated by diluting the acid, leaving an aqueous solution of aluminum salts. The mixture was then filtered to remove the PAEK. The filtrate was analyzed for aluminum using atomic absorption spectroscopy.

The procedure for chloride residue analysis was: PAEK was ignited in a compressed oxygen atmosphere in a closed vessel (bomb). After combustion, water soluble chloride was collected by washing the bomb and analyzed by ion chromatography.

A more complete understanding of my invention can be obtained by reference to the following examples, which are provided for purposes of illustration and not of limitation.

EXAMPLE 1

A batch of PAEK with the repeat unit

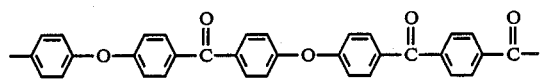

was made generally according to the methods disclosed in the aforementioned U.S. Pat. No. 4,709,007, using a reactor system as disclosed in Becker et al., application Ser. No. 07/110,899, filed Oct. 20, 1987, the disclosure of which is incorporated herein by reference.

A jacketed Hastelloy B-2 reactor was charged with methylene chloride (41.5 kg) and cooled to −10° C. Next, aluminum chloride (22.1 kg) was added followed by dimethyl sulfone (two equal aliquots of 2.15 kg each) such that the mixture was kept below 0° C. at all times. After recooling to −10° C., terephthaloyl chloride (6.175 kg) was added, along with benzoyl chloride (0.154 kg, capping agent) dissolved in methylene chloride (0.2 kg). The mixture was cooled to −13° C. and 4,4′-diphenoxybenzophenone (DPBP, 11.346 kg) was added.

Immediately after the addition of the DPBP, the reactor was sealed and the jacket temperature was raised to 14° C. The reaction exotherm raised the temperature of the mixture to 20° C. over a 10 minute period. After an additional 7 minutes (17 minutes total since the addition of the DPBP), the reactor was pressurized to 50 psig with nitrogen, and its contents were discharged directly into a polytetrafluoroethylene (PTFE) lined tubular reactor. The tubular reactor and its contents were maintained at 20° C. for an additional 4 hours. During this time the mixture became a gelatinous mass.

Next, the gelled mixture was discharged from the tubular reactor, by means of a piston, directly into a Rietz hammer-mill where it was decomplexed with water and ground up until the the polymer pieces could pass through the ⅛ inch holes in the mill screen. The resulting polymer slurry was filtered and recovered. The solids were subsequently washed four times with 80 gallons of fresh water and refiltered between each washing. The isolated polymer (103 kg wet weight, 15.4 kg dry estimated weight, inherent viscosity 1.22 dl/g) contained a fair amount of residual water.

The above-isolated polymer was digested portionwise by the following procedure: 1.5 kg of wet polymer was placed in a 4 liter beaker and fresh deionized water was added to bring the total volume to 3.7 liters. The mixture was stirred at ambient temperature for four hours by means of an overhead agitator equipped with a stainless steel stir paddle. During this time period, the pH dropped from about 6 to 3.5. The beaker was then transferred onto a hot plate and the contents were brought to a boil while under agitation. During this step, the residual methylene chloride was removed azeotropically and the pH continued to drop to 2.5. After approximately one liter of liquid had been removed by boiling (2 to 4 hours), the slurry was filtered and the polymer was washed and refiltered three times with fresh deionized water. The resulting digested polymer (or another sample of polymer digested by the same procedure) was then used for the treatments of the following examples, without drying.

EXAMPLE 2

A sample of digested polymer as prepared in Example 1 was placed inside a glass lined 2 liter Hastelloy B-2 autoclave. Enough fresh deionized water was added such that the slurry attained a final concentration of 60 g (dry weight) of polymer per liter of water. The autoclave was sealed and the temperature of its contents was raised to 165° C. by means of external electric band heaters. The pressure inside the vessel was about 100 psig. This temperature was maintained for five hours before allowing it to cool back to ambient. The autoclave was opened and the pH of the slurry had dropped from about 7 to 3.5. The slurry was filtered and the polymer was washed and refiltered three times with fresh deionized water. The polymer was dried in a convection oven at 200° C. for 16 hours. Some of the dried material was tested for aluminum and chloride residues and molecular weight by inherent viscosity in sulfuric acid; the remainder was melt extruded into strands, chopped up into pellets and hot pressed at 400° C. into circular plaques about 1 inch in diameter and about 2 millimeters thick. The plaques were used to analyze for melt viscosity and melt stability on the Rheometric Mechanical Spectrometer (RMS) at a frequency of 0.5 radians/sec at 400 C. An initial melt viscosity reading was taken after 5 minutes to ensure that the material had reached 400° C. This was compared with the viscosity value after holding for 60 minutes at 400° C. The percent increase of the viscosity over this 55 minute time period was used as a basis for measuring melt stability.

This autoclave treatment was repeated on four more polymer samples from Example 1 using autoclave temperatures of 185, 210, 240, and 270° C. These samples were also analyzed for aluminum and chloride residue content as well as for their RMS melt viscosity behavior. The combined results are tabulated in Table I (along with results from later Examples, to facilitate comparison).

TABLE I

| Example Number | Treatment Temp (°C.) | Al (ppm) | Cl (ppm) | Inh. Vis. (dl/g) | RMS Melt Viscosity | |
| --- | --- | --- | --- | --- | --- | --- |
| | | | | | at 5 min (poise) | at 60 min (% change) |
| 2 | 165 | 1217 | 56 | 1.18 | 25,000 | +110 |
| | 185 | 1252 | 35 | 1.18 | 23,000 | +100 |
| | 210 | 1026 | 31 | 1.23 | 22,000 | +90 |

TABLE I-continued

| Example Number | Treatment Temp (°C.) | Al (ppm) | Cl (ppm) | Inh. Vis. (dl/g) | RMS Melt Viscosity at 5 min (poise) | RMS Melt Viscosity at 60 min (% change) |
| --- | --- | --- | --- | --- | --- | --- |
|   | 240 | 920  | 34  | 1.24 | 19,000  | +60  |
|   | 270 | 550  | 22  | 1.25 | 16,000  | +60  |
| 3 | 100 | 1292 | 154 | 1.18 | 41,000  | +700 |
| 4 | 270 | 542  | 42  | 1.22 | 17,000  | +30  |
| 5 | 260 | 514  | 104 | 1.18 | 65,000  | +900 |
| 6 | 270 | 475  | 30  | 1.16 | 210,000 | −5   |

FIG. 1 shows a graph of water treatment (autoclave) temperature versus the 5 minute melt viscosity values. The melt viscosity of autoclave treated polymer is seen to be substantially lower than that of polymer not subjected to a hydrothermal treatment according to my invention. (See Example 3, below.)

FIG. 2 shows a graph of water treatment (autoclave) temperature versus the percent change in melt viscosity after 55 minutes at 400° C. The stability of the melt viscosity of autoclave treated polymer is substantially greater than that of the polymer of Example 3.

It is also to be noted that samples treated hydrothermally according to my invention exhibit a greater decrease in traces of aluminum and chloride residue than polymer of Example 3.

EXAMPLE 3

This is a comparative example in which the polymer is not treated according to my invention.

A sample of digested polymer as prepared in Example 1 was placed in a one liter beaker. Enough fresh deionized water was added to bring the final slurry concentration to 60 g (dry weight) of polymer per liter of water. A PTFE-coated magnetic stir bar was added to the beaker. It was placed on a stirrer-hot plate and its contents were brought to a boil under agitation. The temperature was about 100° C. The boiling was maintained for 5 hours. During the course of this time, a total of about 100 mL of fresh deionized water was added to the beaker to replace water lost due to evaporation. After boiling, the slurry was cooled to ambient temperature and filtered. The polymer was washed three times with fresh deionized water, refiltering after each time. The material was placed in a convection oven and dried at 200° C. for 16 hours. The resulting polymer was then analyzed as described for samples prepared in Example 2 above. The analysis results are as follows: Al content, 1292 ppm; Cl content, 154 ppm; inherent viscosity, 1.18 dl/g; RMS melt viscosity, 41,000 poise at 5 min and +700% change at 60 min. Reference to Table I above shows both higher a 5 minute melt viscosity and lesser melt stability for this sample as compared with those treated at higher water temperatures according to my invention. (These results are repeated in Table I above for comparative purposes.)

EXAMPLE 4

Polymer was prepared according to Example 1 except that after azeotropically removing the residual methylene chloride from the polymer, the slurry was not filtered. Instead, the unfiltered polymer/water slurry (pH 3.5) was transferred into a 2 liter glass-lined Hastelloy B-2 autoclave. The autoclave was sealed and the temperature of the contents was raised to 270° C. (800 psig) for 5 hours. After cooling to ambient temperature, the pH of the slurry was found to be lowered to 1.5. The slurry was filtered and washed three times with fresh deionized water, refiltering after each time. The material was placed in a convection oven and dried at 200° C. for 16 hours. The resulting polymer was then analyzed as described in Example 2 above. The analysis results were as follows: Al content, 542 ppm; Cl content, 42 ppm; inherent viscosity, 1.22 dl/g; and RMS melt viscosity, 17,000 poise at 5 min and +30% change at 60 min. It can be seen that this procedure produces the same desirable melt property improvements in the polymer as found in Example 2. (These analytical results are repeated in Table I for comparative purposes.)

EXAMPLE 5

This example illustrates the undesirability of using, for the hydrothermal treatment, an aqueous medium to which significant amounts of an acid (excess hydrochloric acid) has been added, thereby lowering the pH of the medium to a value at which the quality of the polymer is negatively affected.

A sample of digested polymer as prepared in Example 1 was placed inside a glass lined 2 liter Hastelloy B-2 autoclave. A volume of 0.15% aqueous hydrochloric acid (w/w) was added until the slurry attained a final concentration of 60 g (dry weight) of polymer per liter of water. The pH was about 1. The autoclave was sealed and the temperature of its contents was raised to 260° C. (680 psig) for 5 hours. After cooling back to ambient temperature and opening the vessel, the pH was still about 1. The slurry was filtered and washed three times with fresh deionized water, refiltering after each time. The material was placed in a convection oven and dried at 200° C. for 16 hours. The resulting polymer was then analyzed as described in Example 2 above. The analysis results were as follows: aluminum content, 514 ppm; chloride level, 104 ppm; inherent viscosity, 1.18 dl/g; RMS melt viscosity, 65,000 poise at 5 min and +900% change at 60 min. It can be seen that the procedure produces higher melt viscosity and poorer melt stability than those of Examples 2 and 4. (These analytical results are repeated in Table I for comparative purposes.)

EXAMPLE 6

This example illustrates the undesirability of using, for the hydrothermal treatment, an aqueous medium to which significant amounts of a base (ammonia) has been added, thereby raising the pH of the medium to a value at which the quality of the polymer is negatively affected.

The procedure of Example 5 was repeated except that a similar volume of aqueous 0.15% ammonia was substituted for 0.15% hydrochloric acid and except that the autoclave temperature was maintained at 270° C. The pH of the slurry was about 9 both before and after autoclave treatment. The analysis results were: aluminum content, 475 ppm; chloride content, 30 ppm; inherent viscosity, 1.16 ppm; RMS melt viscosity, 210,000 poise at 5 min and −5% change at 60 min. It can be seen that this procedure produces polymer of much higher melt viscosity than those of Examples 2 and 4. (These analytical results are repeated in Table I for comparative purposes.)

I claim:

1. A method of stabilizing a poly(arylene ether ketone) comprising the steps of:
   (a) digesting the poly(arylene ether ketone) in an aqueous medium to remove polymerization solvent, and
   (b) hydrothermally treating the poly(arylene ether ketone) by heating it to a temperature of at least 160°°C. while contacting it with water.

2. A method according to claim 1, wherein the digestion step is performed at a temperature between about 35° and about 110° C.

3. A method according to claim 1, wherein digestion step is performed by refluxing the aqueous medium.

4. A method according to claim 1, wherein digestion step is performed in two stages consisting of a first stage at a first, lower temperature and a second stage at a second, higher temperature.

5. A method according to claim 4, wherein the first, lower temperature is between about 10° and about 40° C., and the second, higher temperature is between about 40° and about 100° C.

6. A method according to claim 5, wherein in the second stage the aqueous medium is refluxed.

7. A method according to claim 1, wherein the aqueous medium in the digestion step consists essentially of water.

8. A method according to claim 1, wherein the hydrothermal treatment step is performed at a temperature between about 210° and about 270° C.

9. A method according to claim 1, wherein hydrothermal treatment step is performed in a pressurized vessel in which the poly(arylene ether ketone) is at least partially immersed in an aqueous medium.

10. A method according to claim 8, wherein the aqueous medium in the hydrothermal step consists essentially of water.

11. A method according to claim 1, wherein in the hydrothermal treatment step the poly(arylene ether ketone) is contacted with water by exposing it to superheated steam.

12. A method according to claim 1, wherein the poly(arylene ether ketone) has a repeat unit selected from the group consisting of

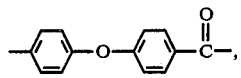

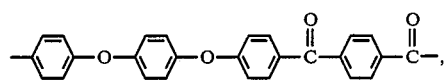

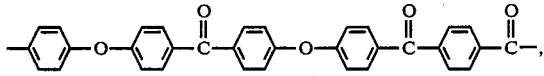

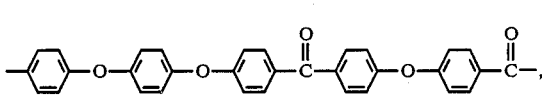

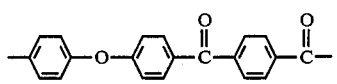

and

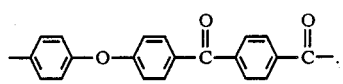

13. A method according to claim 1, in which the digestion and hydrothermal treatment steps are performed in the same vessel.

14. A method according to claim 12, in which the same aqueous medium is used in the digestion and hydrothermal steps.

* * * * *